Jan. 8, 1963 K. KERR ETAL 3,072,833
APPARATUS FOR ELECTRONIC PROGRAMMING OF THREE
CHANNEL MACHINE TOOL AUTOMATIC CONTROL TAPE
Filed March 20, 1959 5 Sheets-Sheet 1
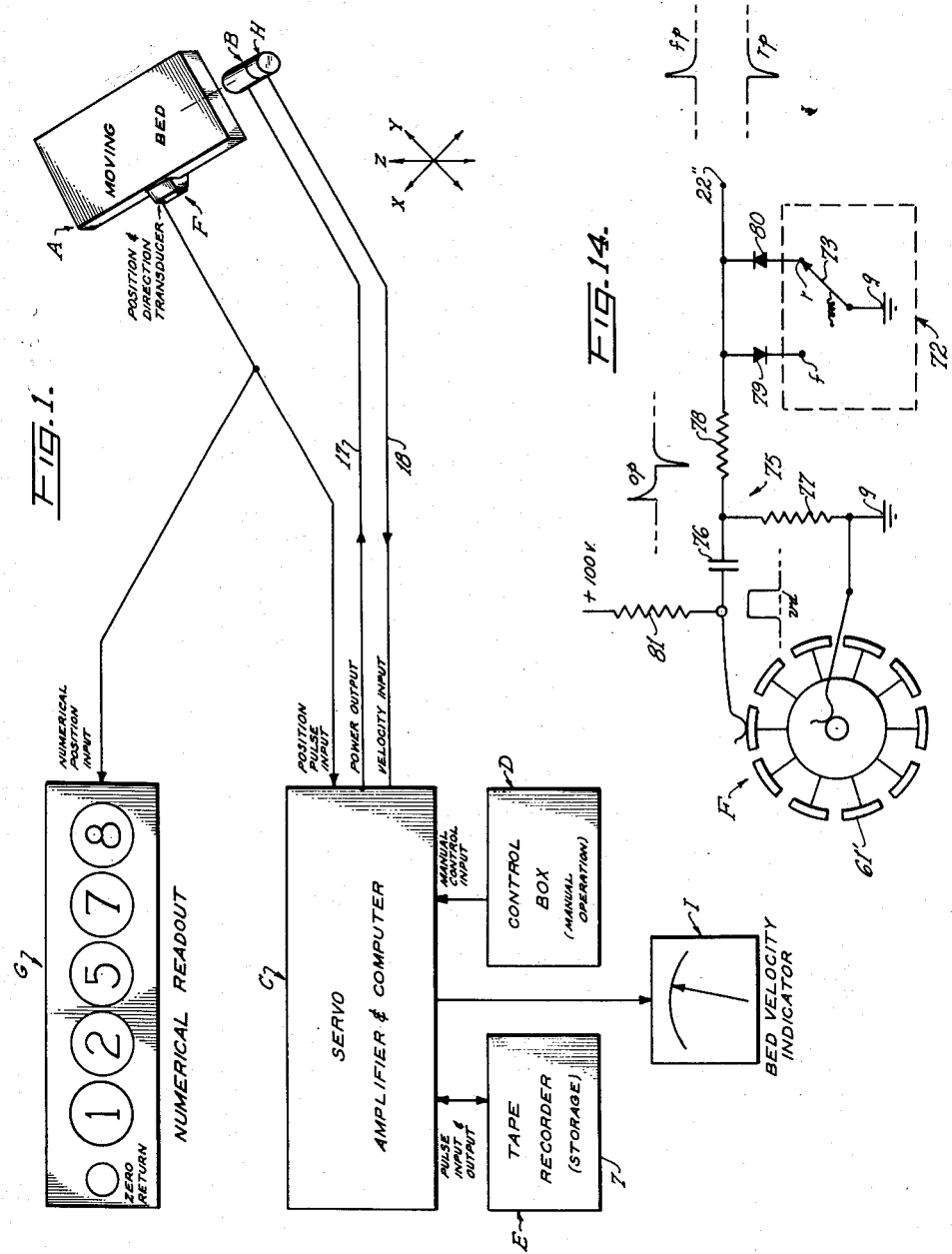
INVENTORS
KINGDON KERR
MALTE SWENSSON
BY
ATTORNEY

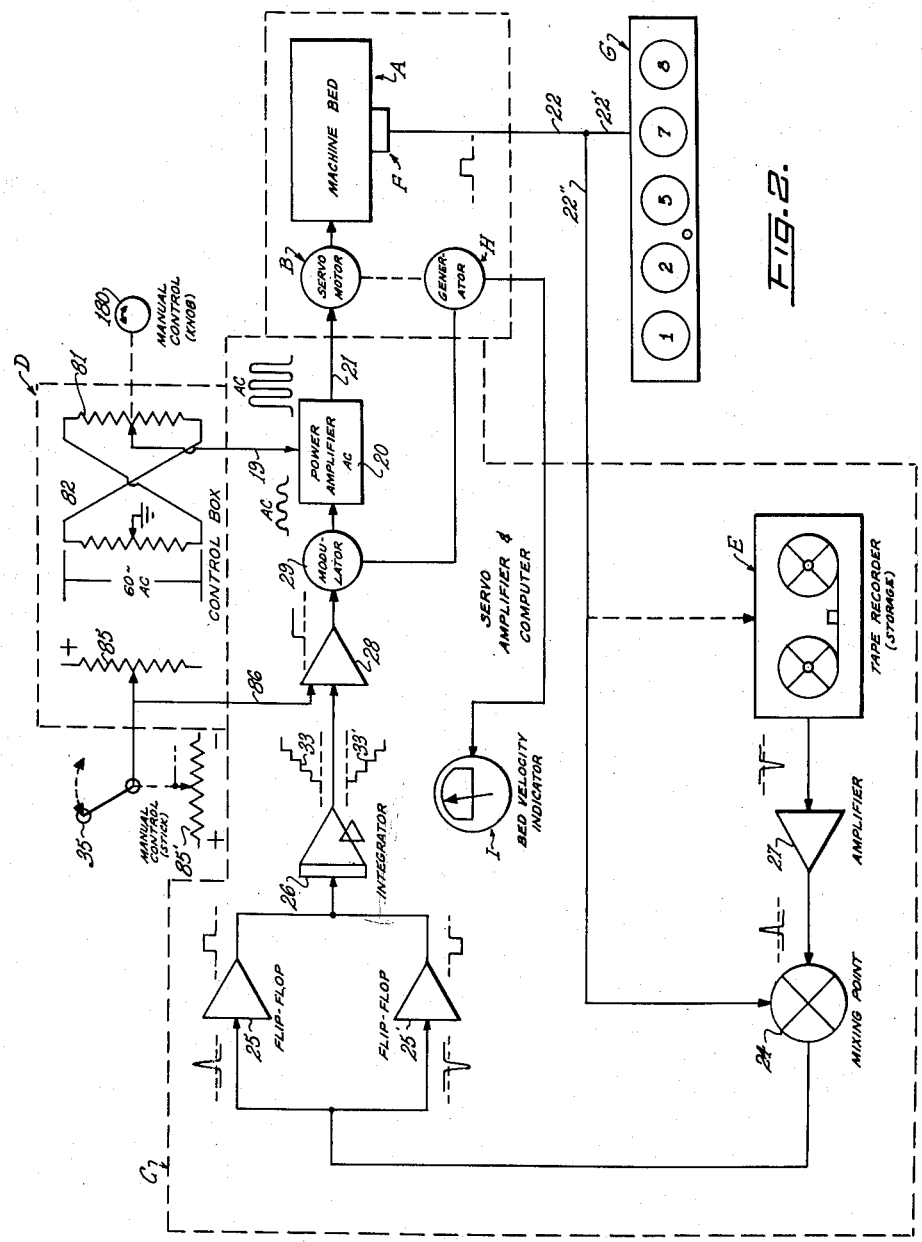

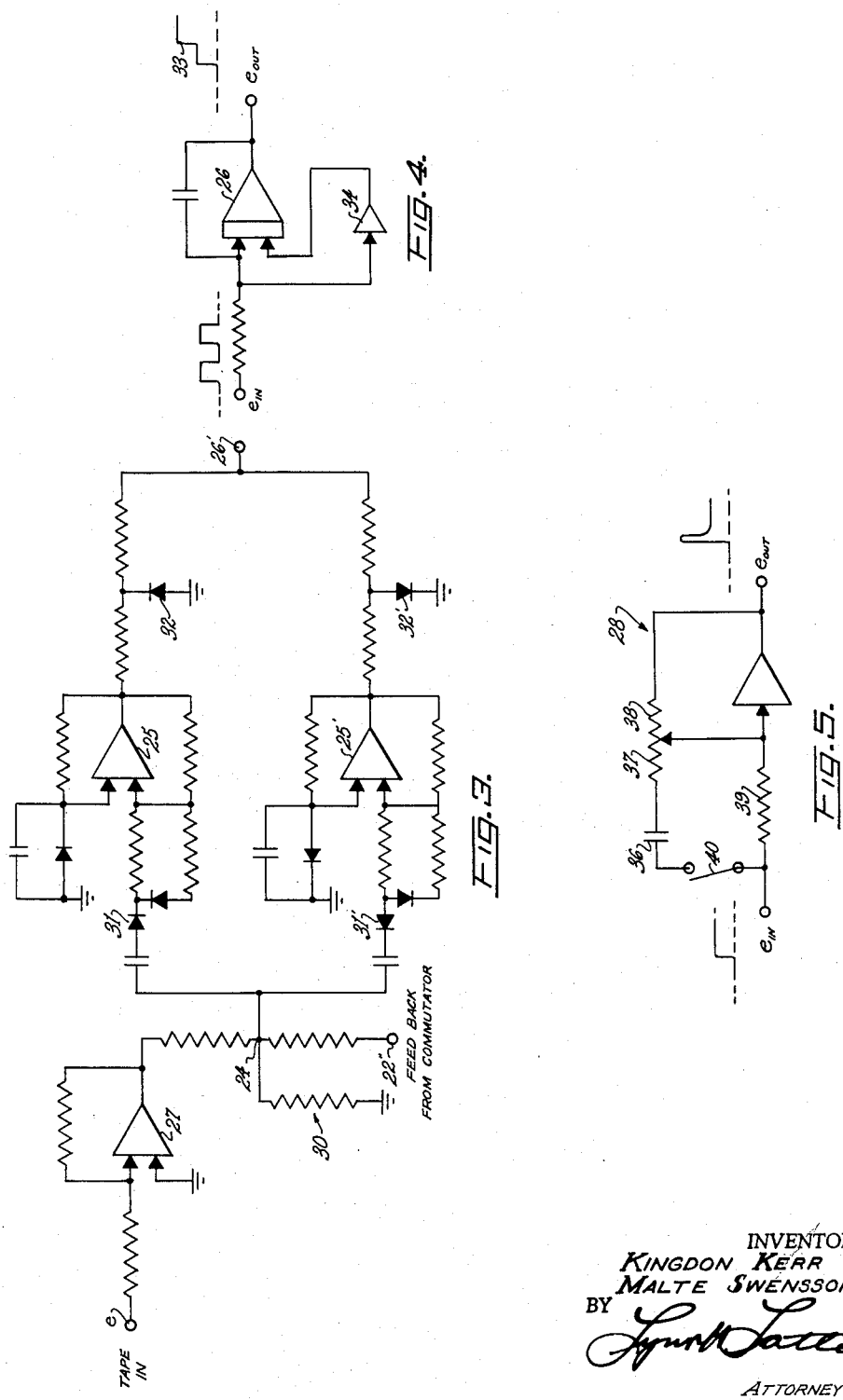

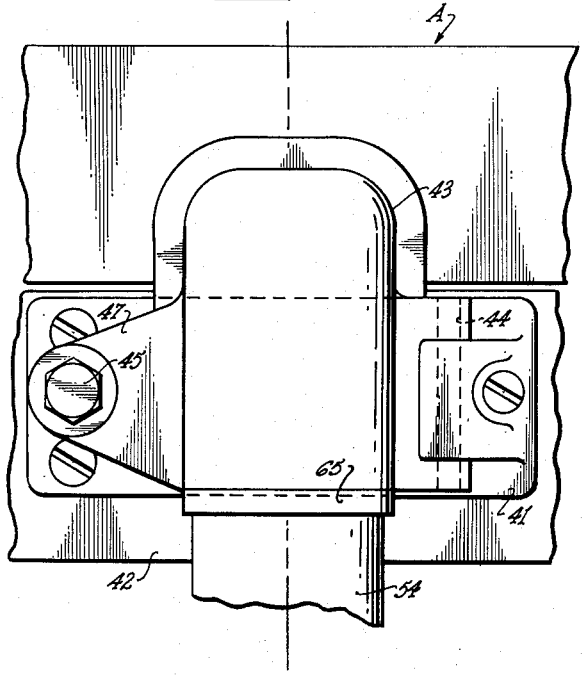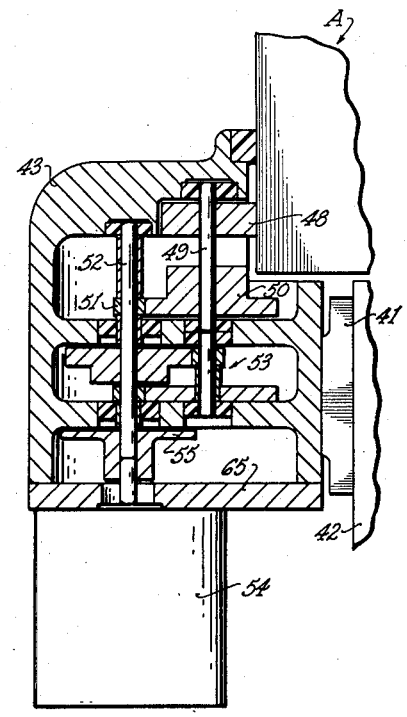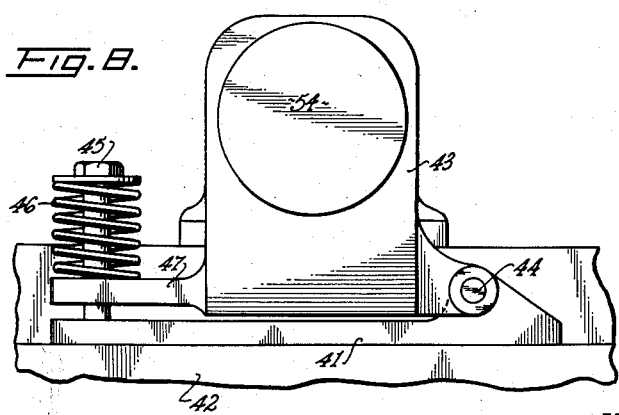

Jan. 8, 1963 K. KERR ETAL 3,072,833
APPARATUS FOR ELECTRONIC PROGRAMMING OF THREE
CHANNEL MACHINE TOOL AUTOMATIC CONTROL TAPE
Filed March 20, 1959 5 Sheets-Sheet 5

INVENTORS
KINGDON KERR
MALTE SWENSSON
BY
ATTORNEY

United States Patent Office

3,072,833
Patented Jan. 8, 1963

3,072,833
APPARATUS FOR ELECTRONIC PROGRAMMING OF THREE CHANNEL MACHINE TOOL AUTOMATIC CONTROL TAPE
Kingdon Kerr and Malte Swensson, Los Angeles, Calif., assignors to Seeco, Inc., Los Angeles, Calif., a corporation of California
Filed Mar. 20, 1959, Ser. No. 800,684
10 Claims. (Cl. 318—162)

This invention relates in general to automatic controls for machine tools, and in particular to an automatic machining system by which parts may be fabricated from a magnetic tape recording of machining operations performed by an operator on a prototype part. More specifically, the invention is developed around the primary concept of developing a programming tape as the direct response to the machining of a prototype part on a machine tool equipped with the apparatus of the invention, the prototype machining being performed by the workman who operates the machine tool in a progressive operation on three axes, the movements on the three axes being recorded on three corresponding channels on a magnetic tape as the direct output of the machine as it is thus incrementally operated. Two manual control systems are provided. In the use of one of them, for developing the more simple geometrical shapes, the workman operates the machine tool in a step by step incremental operation, in increments of .001 inch, numerically, by reference to drawings or other data.

For developing shapes of more complex configuration, such as irregular curves or other configurations not subject to being represented by simple mathematical data, an alternative manual control, adapted for template-following operation, is provided.

An object of this invention is to provide, by electro-mechanical means, a system from which close tolerance parts may be fabricated by a semi-skilled operator, in a fraction of the time required by a skilled operator and at a fraction of the cost of existing automatic equipment now available.

Another object of this invention is to provide a system that can be combined with a used machine tool having backlash from former service and which will compensate for such backlash so as to still meet the foregoing tolerance requirements.

Furthermore, our invention aims to eliminate the need for an expensive computer and highly skilled man-power to pre-program the machine operations as now required in presently available automatic equipment, utilizing only the services of a skilled machine tool operator who can read drawings or trace a template or drawing in order to produce an accurate prototype.

Our invention also has for its object to provide such means that are positive in operation, convenient in use, easily installed upon and disconnected from existing machines, economical of manufacture and of general superiority and serviceability.

Broadly the invention utilizes a controlling system the operations of which are embraced broadly in two categories, namely (a) a prototype machining operation (numerically actuated for ordinary applications) and (b) automatic reproduction of facsimilies of the prototype, utilizing a magnetic recording of the prototype operation.

By use of potentiometer type controls the operator is able to numerically control or velocity-control the cutting operation in such a manner as to machine a part to prescribed dimensions and contours. A lighted numerical indicator is provided to accurately indicate to the operator the distance traversed by the cutter with respect to the part. Other controls such as multiturn potentiometer and a sine-cosine potentiometer are provided to perform sloping cuts and radii. For remote indication of slope and radius dimensions, the longitudinal travel offset and the traverse offset readings are used as a check. The operator controls the power through servo amplifiers by means of the above controls. In machining a prototype part, the operator activates a magnetic tape recorder which records pulses received from the machine representing the dimensional distances on three axes, traversed by the cutter in making the part.

By switching the magnetic tape recorder to "play back," the pulses previously recorded are used to progressively position the cutter through an electronic computer and digital position servo, resulting in an exact replica of the prototype part. Hence it will be seen that the magnetic tape is used to "remember" what the operator did in making the prototype part.

Other objects and advantages will become apparent in the ensuing specification and appended drawing in which:

FIG. 1 is a block diagram of a system embodying our invention;

FIG. 2 is a schematic diagram of the basic system, i.e., the components utilized in operating on one of the three axes (X, Y and Z of the system;

FIG. 3 is a schematic diagram of the diode logic and pulse forming network portion of the system;

FIG. 4 is a schematic diagram of the acceleration storing integrator portion of the system;

FIG. 5 is a schematic diagram of the tracking amplifier-computer portion of the system;

FIG. 6 is a sectional view of the position indicator unit of the system;

FIG. 7 is a front elevational view of the same;

FIG. 8 is a plan view of the same;

FIG. 14 is a schematic diagram of the transducer-responsive control-pulse mechanism.

Figure 9:
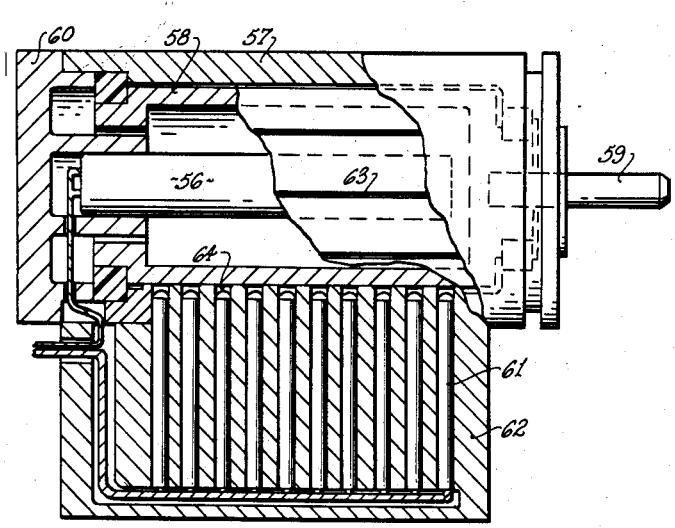
FIG. 9 is a side view, broken away and partially in section, of the pulse counting transducer unit of the system.

Referring now to the drawings in detail, and in particular to the block diagram of FIG. 1, I have shown therein, as an example of one form in which the invention may be embodied, an automatic prototype machining and facsimile reproducing system which will first be described in a general way to identify the main components, their function and relationship.

General Description of System

Basically, the invention provides mechanism for controlled movement of a machine tool bed indicated in perspective block diagram at A in FIG. 1. Movements on X, Y and Z axes are imparted to bed A by three servo-motors, of which one is indicated at B. Assuming for the purpose of illustration that the X axis represents the axis of longitudinal movement of the bed, that the Y axis represents the lateral movement of the bed in a common horizontal plane of X and Y axes, and that the Z axis represents vertical movements of the bed, the servomotor B may be regarded as the means for moving the bed on its longitudinal or X axis. To avoid unnecessary complexity and resultant confusion in the illustration and description of the invention, they are restricted to the components required for effecting and controlling movements on one axis, and it will be understood that most of the components (with the exception of the machine bed A and primary control units D and E, hereinafter referred to) will be utilized in triplicate.

The servomotor B is controlled by a servo amplifier and computer unit C which in turn operates selectively under the control of either of the two primary control units D and E. Control unit D is a manual control unit which is utilized by the machinist in machining the original prototype of an article to be produced, following directional data such as blueprints, numerical specifications, or (for non-geometric or complex geometric shapes) a template or pattern. Control unit E is an automatic control unit which is utilized to record and permanently store on magnetic tape, electric position and direction indicating pulses during machining of the prototype, and which is later employed to direct the automatic reproduction operations when facsimiles of the prototype are being automatically produced by the system. The directional control for such reproduction operations come from a series of control tracks on the magnetic tape or other recording medium, such control tracks comprising primarily the X, Y and Z axis record tracks produced by recording the movements of the machine bed respectively on its X, Y and Z axes during the machining of the prototype.

The system further includes a position and direction sensing and signal transmitting feedback unit F which generates and transmits a position and direction indicating signal simultaneously to a numerical position indicator readout unit G and to the servo amplifier computer unit C. The indicator unit G constantly indicates to the machine operator (during the prototype machining operation) the exact position of the bed A in relation to a reference point, in increments of .001 inch. Simultaneously, the servo-amplifier unit C will accept and transmit to the tape recorder E, the same signals that are actuating the indicator unit G. There are three of the indicators G, one for each axis, so that the bed position is simultaneously indicated in three dimensions. Correspondingly, there are three of the computer units C for controlling movements on the respective axes.

In the automatic machining of facsimiles, magnetic tape recorder 7 is activated to "play back" state, transmitting the recorded signals from its three tracks to the three respective servo amplifier computing units C, from which pulses corresponding to such signals will be transmitted, through triplicate connections schematically indicated at 17, to the servo motor units B for effecting the movements of the bed A. During this operation, velocity control is effected through generaors H (of which there are three, one for each of the three axes) these generators transmitting velocity signals through connections indicated schematically at 18 in FIG. 1, to the respective servo amplifier computer units C. Any known type of velocity signal generator can be utilized, such as for example a tachometer generator. These velocity signals are translated by the servo-computer units into visual indications of said velocity in inches per minute, upon respective indicators I of a meter type.

*Detailed Description—Servo Amplifier Unit C*

Referring now to FIG. 2, wherein the servo amplifier computer unit C is shown more in detail though still in schematic diagram, by the use of potentiometer type controls in manual control unit D (hereinafter described in detail) the operator is able to velocity control the cutting operation in such a manner as to machine a part to prescribed dimensions, being guided by the numerical indicator G which shows him exactly the distance (in increments of .001 inch) that has been traversed by the cutter with respect to the prototype part at any particular instant of prototype machining operation. The control directions coming from unit D at a low voltage are fed through connections 19 into a power amplifier 20 which has an output of sufficient power, transmitted through connections 21 to a respective servo motor unit B, to actuate the latter.

As each step of machining operation takes place, the resultant change in position of the machine bed A is read by the transducer F which generates position signalling pulses corresponding to each .001 inch of bed movement and transmits these signals through the transmitting lines 22, 22' and 22" to the indicator G and to the amplifier-computer unit C respectively.

The amplifier computer unit C receives the position pulses from transducer F at a mixing point 24 from which the pulses are transmitted in parallel to flip-flops 25 and 25' respectively. Simultaneously, direction signals are transmitted from transducer F through the same signal path through mixing point 24 to the flip-flops 25 and 25'. These direction signals actually constitute characteristics of the position pulses themselves, varying in accordance with the direction of movement of the machine bed. Thus, for a forward movement, a pulse of positive value will be transmitted whereas for the opposite or reverse movement of the bed, a pulse of negative value will be transmitted and the positive or negative characteristic of the pulse constitutes a direction signal. It also may be noted at this point, without going into detail, that the directional characteristic of the pulse is imparted to it by the phase switch shown in FIGS. 12 and 13 and that the pulses themselves are generated by a commutator or pulse generator which is shown in detail in FIGS. 6, 7 and 8, and utilizes the principle of interruption of a light beam trained upon a plurality of photocells, and that both the phasing switch and the commutator are components of the movement and direction sensing transducer indicated generally at F.

The flip-flops 25 and 25' operate as directional transmitters, the unit 25 transmitting the positive characteristic pulses and the unit 25' transmitting the negative characteristic pulses to a storing integrator 26.

Before proceeding further with the description of the computer unit C it may be noted that the flip-flops 25 and 25' and the storing integrator 26 are utilized only during the facsimile reproduction, and respond to the reproduction signals transmitted by play-back operation of the tape recorder unit E through an amplifier 27 to the mixing point 24, under the restraining control of position indicating control signals coming from the bed movement sensing transducer F. These latter signals are operative to cancel out the reproduction signals transmitted from tape recorder unit E after the system has responded to these reproduction signals in moving the bed A corresponding increments of movement. That is to say, as the bed A completes an increment of movement corresponding to a particular reproduction signal pulse coming from tape recorder unit E, that reproduction signal pulse will be nulled or cancelled out by a pulse generated and transmitted by the transducer F as the result of the increment of bed movement that has thus been completed, and the system is designed to stop the transmission of power signals to the servomotor whenever all stored reproduction pulses stored in integrator 26 have been cancelled out, and to await directions from further reproduction pulses coming from the tape recorder E.

From the storage integrator 26, the facsimile reproduction pulses are transmitted on to an amplifier 28 which, during facsimile reproduction, functions merely as a voltage amplifier and transmits the amplified signal on to a modulator 29, from which the reproduced pulses are transmitted on to the power amplifier 20, and utilized therein in controlling the generator of power signals for operating servomotor B. During a contour tracking operation, amplifier 28 is adjusted to become a differentiating computer or tracking amplifier (FIG. 5) as will be explained hereinafer. The integrator 26 has an output in the form of a D.C. voltage, the level of which varies in accordance with the number of pulses that have been stored in the integrator, and this output voltage passes on through the voltage amplifier 28 to the modulator 29 as a voltage level signal. It may also be noted at this point that the integrator 26 provides a means for transforming the control signal from digital to analog characteristic, in the sense that the integrator 26 counts and adds pulses (either in a positive direction as indicated by ascending stair case legend 33 or the negative direction as indicated by descending stair case legend 33') and its voltage level as thus attained, at the end of any summation operation, is a single voltage value having analog characteristics. The modulator 29 operates as a valve which is constantly subjected to an A.C. reference voltage but blocks the transmission of that voltage on to the servo-motor portion of the system except when it is activated by the D.C. signals coming from the integrator 26 through the amplifier 28.

*Flip-flop unit—FIG. 3.*—Referring now to FIG. 3 for a more detailed illustration of the flip-flop and immediately associated components, the output side of the tape recorder E is indicated at *e*, and its connections to amplifier 27, and from amplifier 27 to the mixing point 24 through an isolation network indicated generally at 30, are shown in conventional diagram. Also, the feedback connection from bed movement sensing transducer F is indicated at 22". Direction of the triggering action upon flip-flops 25 and 25' is accomplished through a pair of diode logic and pulse-forming networks indicated at 31 and 31' respectively. Triggering of either of these flip-flops produces a square wave of fixed voltage height and fixed width in time. This finite quantity of energy is constant, regardless of the trigger shape or amplitude and has the same polarity (direction signal characteristic) as the triggering pulse. The square wave outputs of the flip-flops 25 and 25' are clamped with respect to "ground" *g* (a selected intermediate reference voltage) by diodes 32 and 32'. The outputs from the respective flip-flops are transmitted through a common parallel connection, indicated at 26' in FIG. 3, to the storing integrator which is shown in detail in FIG. 4.

*Acceleration storing integrator—FIG. 4.*—Referring now to FIG. 4, the acceleration storing integrator is used to sum the energy of the square waves coming from the diode logic and pulse forming network of FIG. 3. As energy can be received from the circuits of FIG. 3 faster than the machine bed can be accelerated by the servomotors, the acceleration storage integrator stores this energy as a staircase voltage of the proper polarity until the machine can increase its speed sufficiently to remove the stored voltage by one of opposite polarity derived from the pulses generated within the bed movement sensing transducer F and transmitted through the feed-back line 22". When the apparatus is operating in one direction, a staircase voltage of positive polarity, indicated at 33, will be stored. When the apparatus is operating in the opposite direction, a staircase voltage that is negative (with respect to the selected reference voltage) is stored, as indicated at 33'. The acceleration integrator 26 is of the operational amplifier type, and includes a chopper stabilizer 34 commonly utilized in the computer art, to compensate for drift in the signal voltage.

*Tracking amplifier—FIG. 5.*—Referring now to FIG. 5, the tracking amplifier shown therein, functions to combine the machine bed velocity signal delivered by the manual controller D with a synthetic position signal obtained by differentiating the velocity signal. This type of control is particularly effective in aiding the operator to control the machine while tracking or following a template or contour line on a drawing. While the main system of automatic machining in the use of our apparatus is basically a velocity controlled system, the addition of the tracking amplifier provides a position signal, superimposed upon the velocity signal, which makes it possible for the operator to position the machine cutting tool with respect to the part while the relationship of the cutter and part have motion corresponding to the velocity commanded by the operator.

To be more explicit, this portion of the mechanism provides for a vernier, very high speed velocity control, which appears to the operator as a position control superimposed on the velocity control, such action being so rapid that it appears as a shift in cutting tool position with respect to the part. This high speed action, or shift, is proportional to control handle position such that small shifts occur with small handle displacements and large shifts occur with large handle displacements. It will be remembered that this control also adjusts machine bed velocity; said velocity being proportional to control handle position. The operator is thus able to position the cutter with respect to a part on the moving bed by moving the control small amounts more or less locally around the general control position corresponding to the particular velocity at command.

The position signal is derived from a capacitor 36, in which the non-resonating velocity signal is differentiated. The velocity signal is a signal of varying voltage in which the voltage level varies directly with the velocity. To explain this, it may be noted that the generator H will generate a voltage directly proportional to the velocity of bed movement, since each generator H is directly driven by its companion servo motor B which directly drives and thus determines the speed of movement of the bed. The position signal which is derived from the capacitor 36 is an instantaneous voltage peak, appearing simultaneously with the velocity signal, and is produced as the result of a rate of change of velocity corresponding to a rate of change of position of the manual control stick 35, and the combination of position and velocity signals, on the voltage gradient, will be a continuing succession of position indicating peaks disposed in succession along the velocity indicating sloping voltage curve. In this respect, the invention makes it possible to follow a contour to whatever degree of accuracy is possible through the facility of the human hand and eye in following or tracking a curve on a drawing or a template. To explain the effect of the control stick 35 more in detail, the command signal generated by the stick is a voltage level signal governed by the stick position and calling for a different bed velocity for each different stick position. The bed operating servo motor B develops torque in proportion to the voltage of the signal developed by the stick 35 and accelerates in the same proportion, attempting to obtain full speed. As it thus accelerates toward the speed called for by the stick position, the velocity signal generator H develops a feedback voltage which is mixed with the stick signal by a subtraction progress, in the modulator 29, and the resultant error signal is amplified in power amplifier 20 and fed through the servomotor as a modulated signal having the desired speed response in the operation of the machine tool bed.

The magnitude of the position signal is controlled by capacitor 36 and resistors 37, 38 and 39, the resistors 37 and 38 being embodied in a potentiometer and inversely variable with relation to one another by shifting the position of the potentiometer slider. This potentiometer includes a manually adjustable pre-setting device for setting the response characteristics of the differentiator. The adjustment is useful in adjusting the differentiator to the individual requirements of the operator, and has the effect of varying the response characteristics of the differentiator from sluggish to rapid response and vice versa. A switch 40 is provided as a connection between the input side of the amplifier and the capacitor 36, for rendering the position signal developing differentiator inoperative when the system is not being used in a tracking operation.

Before proceeding to the next unit of the system, it may be noted that, in the tracking portion of the system, there is provided a manual control for simultaneously setting up both a velocity signal and a position signal, the velocity signal corresponding generally to the velocity signal that is the output of the numerical control unit D that is used in a non-tracking operation, and the position signal being a derivative of the velocity signal and superimposed upon the velocity signal indicating gradient or curve.

Photocell Counting Transducer

Referring now to FIGS. 6, 7 and 8, the transducer F comprises a base 41 which is secured to the fixed frame 42 of the machine tool, and a housing 43 having on one side a hinged connection 44 to the base 41 and on its other side an adjustable spring loaded connection comprising a bolt 45 and a coil spring 46 engaged under compression between the head of the bolt 45 and an ear 47 projecting from the housing 43.

The spring loading provided by parts 45 and 46 functions to provide for spring loaded traction of one or more position reading rollers 48 against the side of bed A and to constantly maintain pressurized engagement of the roller against the bed. A non-slipping engagement of the roller against the bed which is equivalent to a geared connection between the roller and the bed, is provided for by utilizing, for the roller, a permanent magnet of short cylinder form and of extremely high magnetic flux density, such as Alnico or equivalent magnetic material.

Reading roller 48 is secured to a shaft 49 to which is secured a gear 50 meshing with a pinion 51 on a countershaft 52, these gears constituting a part of a gear train 53 which drives two units of mechanism, namely (1) a pulse-generating counting unit 54, hereinafter described in detail, and (2) a friction drive disc 55 of the direction indicator phasing switch which also will be described hereinafter.

Figure 10:
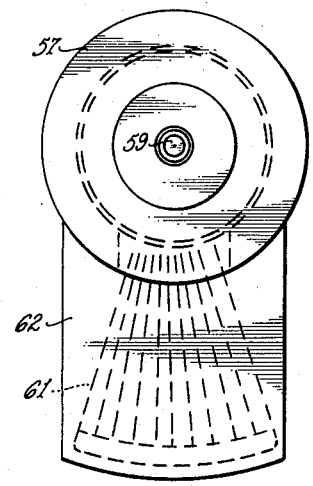
FIG. 10 is a fragmentary transverse sectional view thereof in a radial plane.
Figure 11:
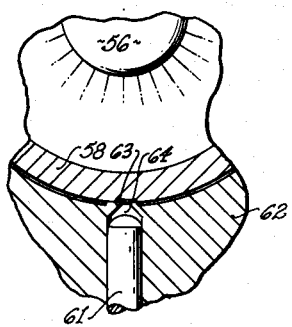
FIG. 11 is an end view of the same.

*Position signal pulse generating counter.*—FIGS. 9, 10 and 11 illustrate the position signal generator which consists in a counting device using a photocell for registering and counting the series of light flashes produced by interruption of light rays from a small diameter, elongated light source 56 (FIG. 9) which may be either a glow discharge lamp or a filament lamp of small diameter, elongated form disposed along the axis of a cylindrical housing 57 and adapted to radiate light beams from said axis along the axial extent of a chamber defined within a cylindrical tubular interrupter rotor 58 which is rotatably mounted within the housing 57 and is driven by a shaft 59 coupled to the driven shaft 52 of the transducer gearing 53 through the hub of friction disc 55 (FIG. 6). Lamp 56 is mounted at its base end in a cap 60 on the opposite end of housing 57 from shaft 59, and extends through a central opening in the adjacent end of interrupter rotor 58.

Interrupter rotor 58 has a transparent cylindrical lateral wall through which the light rays from lamp 58 may pass to a series of photocells 61 which are mounted in a support 62 with their inner ends arranged in a helical path closely adjacent the outer surface of interrupter rotor 58. All photocells extend radially from said helical path as indicated in FIG. 10. The inner ends of photocells 61 are in communication with rotor 58 through respective light transmitting apertures 64 (FIG. 11) in the support 62 at the cylindrical inner surface thereof conforming to the periphery of rotor 58. Rotor 58 has a series of opaque interrupter bars 63 inlaid in or painted on its outer surface at equally circumferentially spaced positions, all bars extending parallel to the rotor axis and adapted to sweep circumferentially, in succession, past the helical row of photocells 61 so as to drop the voltage level in each photocell as the respective aperture 64 is momentarily covered by the respective interrupter 63. The cylindrical inner surface of interrupter rotor 58 is reflective so as to concentrate a maximum intensity of light rays at the row of apertures 64, and the drop in the aggregate voltage level of the photocells resulting from the blocking of an aperture, is sufficient to generate an electric pulse to which the system will respond. The total number of pulses per revolution will be the product of the number of photocells 61 and the number of interrupter bars 63. The number of revolutions of the interrupter rotor 58 per revolution of follower roller 48 is so related to the circumference of the latter as to obtain one pulse for each .001 of an inch of linear traverse of the machine bed A past the transducer mechanism F.

As shown in FIG. 6, follower roller 48, shaft 49 and countershaft 52, gearing 53 and friction drive disc 55 are housed and journalled in the casing 43 and the counter 54 is carried by a supporting plate 65 which may be a cap on one end of housing 43.

Figure 12:
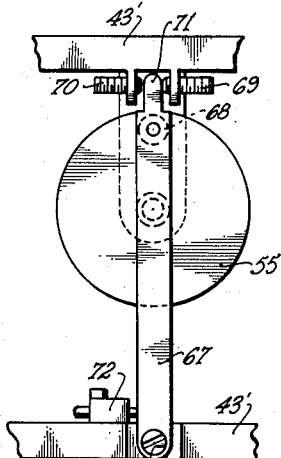
FIG. 12 is a front view of the automatic phasing switch of the system, for directional control.
Figure 13:
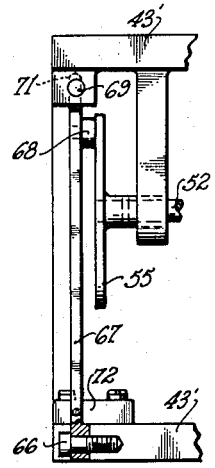
FIG. 13 is a side view of the same.

*Automatic phase switch (direction indicator).*—FIGS. 12 and 13 disclose the phasing switch as a separate unit which can be driven either from the shaft 52 or the shaft 59 but preferably is installed within the transducer housing 43, utilizing the friction disc 55 as its driving part. It embodies a casing 43' which preferably is the casing 43 of FIG. 6 and having a suitable bearing support, as shown, for the shaft 52 which drives the disc 55. Pivoted at 66 to the casing 43', for rocking movement, is a switch actuator lever 67 which, at its swinging end, carries a shoe 68 which bears, with frictional engagement, against the flat end face of friction disc 55. The lever 67 may be resilient and is arranged to support the shoe 68 in magnetic engagement with the friction disc 55 with a tenacious engagement sufficient to assure immediate response to any change in direction of disc 55 followed by slipping engagement therewith as a limit position is reached. Shoe 58 is a permanent magnet to provide the desired tenacious engagement with disc 55. Lever 67 has a small amplitude of swing between limit positions determined by a pair of stop screws 69, threaded through suitable mounting parts in casing 43' and adjustable to vary said limit positions. A finger 71 on the swinging tip of lever 67 is disposed between the stop screws 69, 70 and upon moving into engagement with the screw 70, permits the lever 67 to actuate a reversing switch 72 mounted in casing 43', shifting the switch from one to another of two alternate positions, in one of which it is adapted to transmit a "forward" movement indicating signal and in the other of which it is adapted to transmit a "reverse" movement indicating signal.

Referring now to FIG. 14, wherein the transducer unit F is shown schematically, the reversing switch 72 embodies a moving contact 73, spring loaded to one of its two positions as indicated, and adapted to be moved to its alternate position in response to the shifting of lever 67. The switch further embodies a pair of fixed contacts for the respective forward and reverse signals, indicated at *f* and *r* respectively. The moving contact 73 is constantly connected to a part of the system, indicated at *g*, where a reference voltage level intermediate the upper and lower voltage levels of the respective forward and reverse indicating pulses, is maintained. These pulses, indicated in diagram at *fp* and *rp* respectively, are fashioned by the action of reversing switch 72 upon an incoming series of pulses, indicated in diagram at *op*, which is generated as a response to transducer unit F at each momentary drop in voltage therein by the blocking of a photocell. The voltage drop is indicated in FIG. 14 at *vd* as a square wave modulation of a 100 volt positive potential designated +100 v., applied to the photocell 61 through a common connection as the output of transducer unit F. The square waves *ve* are converted into pulses *op* by being differentiated by a differentiator 75, including series connected capacitor 76, resistor connection 77 to the reference voltage level, and resistor 78 on the output side thereof. As indicated by the diagram, the incoming pulses *op* consist of pairs of voltage peaks of opposite polarity with respect to the reference voltage level, and these voltage peaks are delivered by the differentiator 75 to the feedback connection 22" of FIG. 3, past a pair of diode rectifiers 79 and 80 which provide shunt connections to the reference voltage level *g* and operate to clamp to "ground" one or the other of the opposite voltage peaks of the incoming pulses *op*, thereby converting each pulse *op* to a unidirectional pulse

*fp* or *rp* by draining off and eliminating one peak or the other from pulse *op*.

The counter of transducer F is shown schematically in FIG. 14, the several photocells being indicated at 61' as a series of conductive connections to the reference level *g* in a commutator-like arrangement corresponding to the combination of interrupter rotor 58 and photocells 61 of FIGS. 9–11, functioning to momentarily drop the voltage applied to the differentiator 75 by voltage source +100 v. through a resistor 81 which is calibrated suitably to provide the desired amount of voltage drop, the square wave *vd* being produced by the return of the voltage level to its maximum value of 100 volts in the interium between voltage drops generated in the counter 54.

The voltage deviations from the reference level, developed in the pulses *fp* and *rp* are compared to the voltage deviations of the pulses fed into the network from the input connection *e* from the tape recorder, and are of inverse polarity relation to the tape recorder pulses so as to exactly cancel, in the storing integrator 26, stored pulses corresponding to the control pulses coming from the transducer F, dropping the voltage level in the storage integrator 26 an amount corresponding to each cancelled pulse.

Control apparatus D—Operation of System

*Numerical control.*—The numerical control mechanism comprises three separate units, one of which is schematically illustrated in FIG. 2, for controlling movements respectively on the X, Y and Z axes. Each of these control units has a control knob 180 which is connected to the slider of a potentiometer 81 constituting the output side of a variable center-tapped transformer 82 having a 60 cycle alternating current input indicated at 60*w*. The transformer 82 is further characterized by a double slider and Wheatstone bridge arrangement such that, at a median or centered position of control knob 80, the alternating currents of opposite phase in the respective sides thereof will have a nulling effect resulting in zero output, whereas a movement of the slider mechanism to one side of the null point will deliver an alternating output current of one phase and of intensity depending upon the extent of displacement of the control knob from the null position, and, upon movement of the control knob to the other side of the null position, delivering an alternating current of opposite phase and of intensity varying directly with the extent of displacement of the control knob from the null point. This alternating output of the transformer 82, indicated at A.C. in FIG. 2, is fed into the power amplifier 20 through connection 19 and the output A.C. of the latter, having the same phase but of amplified intensity, is fed to the servomotor B, which is a reversible motor, and operates the latter in one direction or the other depending upon its phase.

The response to the knob 180 is purely a velocity response without any position indication in the A.C. voltage signal. The feed-back velocity control signal coming from generator H and fed through modulator 29, adjusts the speed by being fed through modulator 29 into power amplifier 20 and mixed with the signal from knob 180 to effect operation at the speed called for by the position of knob 180, in a manner similar to the above described velocity control in connection with operation of manual control stick 35.

Servomotor B will respond, running at a speed corresponding to the intensity of the power signals A.C. received thereby, continuing to operate so long as the control knob 80 is displaced, and stopping when the knob is returned to the null point. Thus it will be apparent that the manual control of the machine bed by control knob 80 is in effect a velocity control, continuing so long as the control knob is displaced and stopping when the control knob is returned to its null position, the total elapsed time for any stage of operation depending upon the speed of operation as determined by the extent of displacement of the control knob. During any stage of such operation, the operator will monitor the operation by reference to the visual indicators I (indicating speed of operation) and G (indicating the extent of movement along a particular axis). For example, for a straight cut parallel to the X axis will be actuated until the distance specified by blueprints or other directions has been traversed. Assuming that a horizontal transverse cut is then to be made, the control knob for the Y axis will be actuated until the specified length of transverse cut has been executed. Thus the machining of a prototype, following a dimensioned drawing or equivalent data, is effected by numerical monitoring control using primarily the numerical readout G.

*Sloping cut, etc., control.*—For a sloping cut in a straight line on a specified gradient (e.g. a specified angle intermediate the X and Y axes) the invention provides one or more multiturn potentiometers to be used in lieu of the potentiometer 81 shown in FIG. 2. Such a multiturn potentiometer is connected into the control circuits 19 of any selected two axes (e.g. the X and Y axes). The respective turns of this potentiometer are arranged to control their respective servomotors at velocity rates which are related to one another in a selected ratio such as to produce the required angle of sloping cut. For example, at a 1:1 velocity ratio between X and Y motors, a cut at 45° between the X and Y axes will be accomplished, and by utilizing a potentiometer providing a 2:1 ratio of velocity, a cut on a straight line on a 30°–60° slope can be obtained. Separate potentiometers, preset to provide such major gradients, can be utilized. Alternatively, a multiturn potentiometer normally operating on a 1:1 ratio may be provided with means for mechanically or electrically varying such ratio in an infinite number of changes so that its control effect will provide for variably controlling a pair of servomotors B at any selected ratio of respective velocities to attain any selected gradient of cut.

Since the use of a multiturn potentiometer, in effect, entails only the coupling of two of the potentiometers 81 for operation in unison, illustration thereof is omitted from the drawings in the interest of simplicity.

For controlling a pair of servomotors B with a constantly varying ratio between their respective velocities of operation, the invention further provides for making radii cuts of circularly curved contour, using a sinecosine potentiometer for controlling the two servomotors in a manner broadly analogous to the joint control of two servomotors by the multiturn potentiometer. For remote indication of slope and radius dimensions, the longitudinal and traverse offset readings are used as a check in the operator's monitoring operation.

*Template-following control.*—The template-following control stick 35 is a two-directional control arranged to simultaneously operate the sliders of a pair of potentiometers 85 and 85' respectively, the control stick 35 having a universal movement which may be similar to that of the gear shift lever of an automobile transmission. Movement of the lever in one plane will be utilized to control movement of bed A on the X axis, as by operating the slider of potentiometer 85, whereas movement in a plane at right angles thereto may be utilized to actuate the potentiometer 85' to control bed movement along the Y axis. Thus it becomes possible by moving the control stick 35 along a path corresponding to a drawing or template contour to be followed, to jointly operate both potentiometers in a manner to reproduce, in the prototype part, the contour being tracked by the control knob 35.

The potentiometers 85 and 85' control the level of D.C. voltage coming from a suitable D.C. supply, the modulating voltage being applied through a conductor 86 to the tracking amplifier of FIG. 5. Successive increments of movement of the lever 35 along either the X or Y axis (and the respective X and Y components of the movement in a diagonal direction) are registered by the respective tracking amplifiers 28, connected to the respective potentiometers 85 and 85', as instantaneous voltage increases resulting in the position indicating peaks hereinbefore referred to in the description of FIG. 5.

We claim:

1. Programming apparatus for an automatic control system for a machine tool having a bed, comprising, in combination: a plurality of servomotors for moving said bed on respective axes; a corresponding plurality of manual controllers for generating electric signals for controlling the respective servomotors with a velocity response having a magnitude determined by the position of the respective manual controller generating the signal; a corresponding plurality of position signal generating transducers driven by movements of said bed on the respective axes; digital position indicators responding to the signals generated by the respective transducers, for monitoring the operation of said servomotors in the machining of a prototype work article; means responding to said transducers to record and reproduce said transducer generated signals; respective storing integrators each responsive to a respective series of reproduced signals to develop and store a staircase voltage; means responding to said staircase voltage to control the transmission from a power source of power signals for operating said servomotors in a facsimile reproducing operation; and means for feeding back to said integrator, new position indicating signals generated by a respective transducer, for reducing said staircase voltage in proportion to the extent of bed movement, whereby the speed of response of said bed to the stored signals is independent of the speed of reception of reproduced signals.

2. An apparatus as defined in claim 1, including a plurality of direction signal generating devices each responsive to directional change of movement of said bed on a respective axis arranged to impart a directional characteristic to each position indicating signal generated by the respective transducer; and a plurality of flip-flop networks triggered by said directional characteristics, for directionally transmitting reproduced signals to respective integrators in accordance with their respective directional characteristics.

3. An apparatus for controlling the operation of a machine tool having a bed, in the machining of a prototype and the reproduction of facsimiles of said prototype, in response to manually developed prototype machining control signals and signals recorded on a record medium, in combination: a plurality of servomotors for moving said bed on respective axes; a corresponding plurality of position feed-back signal generating transducers driven by movements of said bed on respective axes; means to record, store and reproduce said recorded signals; manually controlled means to generate voltage-level, velocity indicative original signals for controlling the machine of a prototype; respective storing integrators each responsive to a respective series of either original or reproduced signals to develop and store a staircase voltage; electrical means responding to said staircase voltage to control the transmission from a power source of power signals for directly operating said servomotors in prototype machining and facsimile reproducing operations; and means for feeding back to said integrators, new position indicating signals generated by respective transducers, for reducing said staircase voltages in proportion to the extent of bed movement, whereby the speed of response of said bed to the stored signals is independent of the speed of reception of reproduced signals.

4. A control system as defined in claim 3, wherein said staircase voltage responsive means includes an A.C. power amplifier, and a modulator constantly subjected to an alternating reference voltage and operating as a valve in response to said staircase voltage to feed said reference voltage to said power amplifier for developing said power signals.

5. A control system as defined in claim 4, including a voltage amplifier interposed between said integrator and said modulator and responding directly to said staircase voltage to actuate said modulator.

6. Apparatus as defined in claim 5, including means for converting said voltage amplifier into a differentiating amplifier for superimposing a position-indicating pulse on a velocity indicating staircase voltage.

7. An apparatus for controlling the operation of a machine tool having a bed, in the reproduction of facsimiles of a previously machined prototype, in response to signals recorded on a record medium, in combination: a plurality of speed-controllable servomotors for moving said bed on respective axes; a corresponding plurality of position signal generating feed-back transducers driven by movements of said bed on respective axes; a plurality of direction signal generating devices each responsive to directional change of movement of said bed on a respective axis, arranged to impart a directional characteristic to each position indicating signal generated by a respective transducer; a plurality of flip-flop networks, triggered by said directional characteristics, for directionally transmitting reproduced signals; means for reproducing stored signals; respective storing integrators each responsive to a respective series of reproduced signals transmitted through a respective flip-flop network to develop and store a staircase voltage indicating both position and direction; means responding to said staircase voltage and to back-feed signals delivered from said transducers, directly to control the transmission from the power source of power signals for directly operating said servomotors directionally in a facsimile reproducing operation; and means for feeding back to said integrator, new directional and position indicating signals generated by a respective transducer, for reducing said staircase voltage in proportion to the extent of bed movement, whereby the speed of response of said bed to the stored signals is independent of the speed of reception of reproduced signals.

8. A control system as defined in claim 7, wherein said transducers are each in the form of a counter comprising an elongated light source; a plurality of photocells arranged in a helical path with reference to the longitudinal axis of said light source; and a cylindrical interrupter rotor enclosing said light source and rotated by said reading roller, said cylinder including alternating light transmitting areas and opaque light beam interrupting bars extending longitudinally thereof in circumferentially alternating arrangement, said light transmitting areas and beam interrupting bars sweeping past said photocells so as to sequentially shade said photocells from said light beam in succession so as to produce a large number of voltage-drop pulses for each rotation of said rotor.

9. Programming apparatus for an automatic control system for a machine tool having a bed, comprising, in combination: a plurality of servomotors for moving said bed on respective axes; a corresponding plurality of manual controllers for generating electric signals for controlling the respective servomotors with a velocity response having a magnitude determined by the position of the respective manual controller generating the signal; velocity signal generator means operating in timed relation to the respective servomotors for mixing with said manually generated signals, velocity signals indicative of the speed of servomotor operation, whereby to create an error-signal for regulating the velocity response of said servomotors to said manual signal generating means; a plurality of position signal generating transducers, one for each of said servomotors, driven respectively by movements of said bed on the respective axes; and digital position indicators responding to the signals generated by the respective transducers and visually indicating to an operator the distances moved by said bed along its respective axes, for monitoring individually the operations of said servomotors in moving said bed along the respective axes in the machining of a prototype work article, whereby said prototype article can be developed under full manual control by reference to instructional data.

10. Apparatus as defined in claim 9, in combination with means responsive to said velocity responsive and position signals for recording said signals on a record for subsequent use in reproducing facsimiles of said prototype article.

References Cited in the file of this patent

UNITED STATES PATENTS

| | | |
|---|---|---|
| 2,537,770 | Livingston et al. | Jan. 9, 1951 |
| 2,748,665 | Senn | June 5, 1956 |
| 2,782,348 | Luhn | Feb. 19, 1957 |
| 2,843,811 | Tripp | July 15, 1958 |
| 2,882,476 | Wetzel | Apr. 14, 1959 |